US007647053B2

(12) United States Patent
Pitchers

(10) Patent No.: US 7,647,053 B2
(45) Date of Patent: Jan. 12, 2010

(54) ELECTRONIC DEVICE, METHOD AND COMMUNICATION SYSTEM

(75) Inventor: Stephen M. Pitchers, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 316 days.

(21) Appl. No.: 10/538,282

(22) PCT Filed: Dec. 5, 2003

(86) PCT No.: PCT/IB03/05742

§ 371 (c)(1),
(2), (4) Date: Jun. 10, 2005

(87) PCT Pub. No.: WO2004/056045

PCT Pub. Date: Jul. 1, 2004

(65) Prior Publication Data

US 2006/0111042 A1 May 25, 2006

(30) Foreign Application Priority Data

Dec. 18, 2002 (GB) ................................. 0229529.3

(51) Int. Cl.
 H04Q 7/20 (2006.01)
(52) U.S. Cl. .................... 455/450; 455/451; 455/452.1; 455/452.2; 455/454
(58) Field of Classification Search ................. 455/450, 455/451, 452.1, 452.2, 512, 41.2, 509, 454
See application file for complete search history.

(56) References Cited

U.S. PATENT DOCUMENTS

| 6,560,443 | B1 * | 5/2003 | Vaisanen et al. | 455/73 |
| 6,842,607 | B2 * | 1/2005 | Godfrey et al. | 455/41.2 |
| 7,099,671 | B2 * | 8/2006 | Liang | 455/450 |
| 2002/0061031 | A1 * | 5/2002 | Sugar et al. | 370/466 |

FOREIGN PATENT DOCUMENTS

| EP | 1 119 137 | 7/2001 |
| EP | 1 207 654 | 5/2002 |
| WO | WO 01 84789 | 11/2001 |

* cited by examiner

Primary Examiner—Minh D Dao

(57) ABSTRACT

An electronic device has first and second wireless transceiver modules using first and second communication protocol, respectively. Both wireless transceiver modules are coupled between an application layer and an at least partially shared physical layer of the electronic device. The second wireless transceiver module is equipped with a controller to avoid interference with external signals on a frequency used by the second communication protocol. To avoid destructive interference in the physical layer resulting from simultaneous communications from or to the first and second wireless transceiver modules, the electronic device further includes a mediator, which is responsive to an enabled communication involving the first wireless transceiver module, and which feeds a blocking signal into the controller to avoid interference between the enabled communication and a transmission of the second wireless transceiver module.

24 Claims, 2 Drawing Sheets

ELECTRONIC DEVICE, METHOD AND COMMUNICATION SYSTEM

The present invention relates to an electronic device that has a first wireless transceiver module for communicating using a first communication protocol and a second wireless transceiver module for communicating using a second communication protocol, the second wireless transceiver module comprising a controller for avoiding an interference with an external signal on a frequency of the second communication protocol.

The present invention also relates to a method for controlling communications involving a communication system, the communication system comprising a first wireless transceiver module using a first communication protocol, and a second wireless transceiver module using a second communication protocol, the second wireless transceiver module comprising a controller for avoiding an interference with an external signal on a frequency of the second communication protocol.

The present invention further relates to a communication system having a wired network, a first wireless transceiver module coupled to the wired network for communicating with a first electronic device using a first communication protocol, and a second wireless transceiver module coupled to the wired network for communicating with a second electronic device using a second communication protocol, the second wireless transceiver module comprising a controller for avoiding a conflicting communication on a frequency of the second communication protocol.

In the context of this application, the interpretation of a wireless transceiver module should not be limited to a single discrete piece of hardware; it may also be a collection of hardware elements or a combination of hardware and software implementing the transceiver functionality.

The application domains of wireless communication protocols are becoming more and more diverse. Well-known application domains include electronic devices like mobile telephones, which may use protocols like the global system for mobile communication (GSM) and Universal Mobile Telecommunication Service (UMTS). Further application domains include the global positioning system (GPS), Wireless Local Area Network (WLAN), for instance, the IEEE 802.11 standard, as well as in-home or in-office networking. The latter application may use protocols like Zigbee or Bluetooth, and may involve communications between mobile phones, computers, DVD players, TV sets and so on. In addition, remote control systems use some sort of wireless communication protocol, which may operate outside the radio frequency (RF) spectrum, like in the infrared (IR) frequency domain.

The ongoing increase in data communication density within a frequency domain can cause threats to the integrity of the communicated data, for instance because of the occurrence of interference between two different communications using two different protocols that share the same bandwidth. Such interference can occur when an electronic device that has two wireless transceiver modules employing two different protocols that may, at least partially, share a frequency bandwidth, and may occur in the air or at the physical level of the electronic device transmitting or receiving the data of one of the communications. Such interference can mutilate the involved data beyond recognition or can substantially slow down the transfer rate of the data, and should therefore be avoided.

US patent application 2002/0061031 discloses a wireless communication device using a first and a second communication protocol for communicating between a plurality of communication devices, with a first communication protocol using a carrier sense multiple access principle for avoiding collision of packets being transmitted at the same time by more than one communication device from the plurality of communication devices. Interference caused by the simultaneous transmission of two packets using the two communication protocols is avoided by either using notch filters on one of the signals to reduce or even remove the frequency overlap between the signals, or by rescheduling one of the two transmissions by prioritizing the transmissions to avoid temporal overlap between the two packets.

However, both these measures have the disadvantage that substantial additional dedicated processing has to be introduced to avoid the collision of the two packets, either by means of the introduction of notch filters on both the transmitter and receiver end of the channel, or by means of additional scheduling or arbitration functionality, which involves the evaluation of the nature of the packet in order to be able to assign a transmission priority to the packet.

Inter alia, it is an object of the present invention to provide for an electronic device according to the opening paragraph that at least partially avoids interference between communications involving the two wireless transceiver modules without the need for dedicated signal modification of the communications involving those wireless transceiver modules.

It is a further object of the present invention to provide for a method according to the opening paragraph for at least partially avoiding interference between communications involving the two wireless transceiver modules without having to process the communications involving those wireless transceiver modules.

It is yet a further object of the present invention to provide a communication system according to the opening paragraph that at least partially avoids interference between communications involving the two wireless transceiver modules without the need for dedicated signal processing of the communications involving those wireless transceiver modules.

An object of the invention is realized by an electronic device, comprising a first wireless transceiver module using a first communication protocol; a second wireless transceiver module using a second communication protocol, the second wireless transceiver module comprising a controller for avoiding an interference with an external signal on a frequency of the second communication protocol; and a mediator coupled between the first wireless transceiver module and the second wireless transceiver module, the mediator being arranged to provide the controller with a blocking signal in response to an enabled communication involving the first wireless transceiver module.

The invention is based on the realization that a controller for avoiding an interference with an external signal on a frequency of a communication protocol can be reused to prevent signal, or packet, collision between two different wireless transceiver modules, for example, two radios, inside the same device as well. Such collisions may occur when the communication protocols of the two wireless transceiver modules share at least a part of a frequency band, or when the two wireless transceiver modules share resources in the physical layer of the electronic device. The controller of the second wireless transceiver module which may be implemented in hardware, software or a combination thereof, and which may be an implementation of the carrier sense multiple access-collision avoidance (CSMA-CA) principle, is not only made responsive to its intended broadcast frequency, but also to the mediator, which in its turn is responsive to the first wireless transceiver module. This way, as soon as the first wireless transceiver module for instance is involved in either the reception but especially in the transmission of a signal like a packet, the mediator will provide the controller of the second wireless transceiver module with a signal mimicking the presence of an external signal on the intended broadcast frequency of the second wireless transceiver module.

Consequently, the second wireless transceiver module will postpone transmissions for a time period governed by the controller, thus leading to a reduction of the chance of interference between data traffic involving both the first and the second wireless transceiver module. This has the advantage that rather than detecting the presence of a signal in the wireless channel, the controller of the second transceiver module is responsive to a possibly conflicting communication with an enabled communication involving the first transceiver module before the enabled communication actually enters the wireless channel, which provides a further reduction of the chance of interference between communications form the first wireless transceiver module as well as the second wireless transceiver module. Alternatively, the first wireless transceiver module may notify the physical layer that it is expecting to receive a packet for instance by communicating a reception frequency to the physical layer; this notification may also be observed by the mediator, in which case a transmission from the second wireless transceiver module can be blocked before the enabled communication involving the first wireless transceiver module (i.e., the reception of the expected packet) has entered the wireless channel. The present invention has the further advantage that at least the baseband sections of the wireless transceiver modules, like a Bluetooth or a Zigbee chip, do not have to be significantly altered to implement the present invention, which makes the present invention particularly cheap to implement.

In an embodiment of the present invention, the mediator is arranged to provide the blocking signal during a time interval matching the duration of the enabled communication.

This has the advantage that when the first wireless transceiver module implements a protocol that uses time intervals during which transmissions are enabled, the generation of the blocking signal by the mediator can be synchronized with those time intervals, for instance by making the mediator responsive to the clock signal. This ensures that during those time intervals, no interference between transmissions from the first and second wireless transceiver module can occur.

In a further embodiment of the present invention, the first wireless transceiver module comprises a further controller for avoiding an interference with a further external signal on a frequency of the first communication protocol; the mediator being further arranged to provide the further controller with a further blocking signal in response to a further enabled communication involving the second wireless transceiver module.

If both wireless transceiver modules include such a controller, the mediator can provide blocking signals to either one of the controllers of a wireless transceiver module in response to an enabled transmission involving the other wireless transceiver module. This has the advantage that the chance of interference between transmissions involving both the first and the second wireless transceiver module is even further reduced.

Now, the further object of the present invention has been realized by a method for controlling communications involving a communication system, the communication system comprising a first wireless transceiver module using a first communication protocol; a second wireless transceiver module using a second communication protocol, the second wireless transceiver module comprising a controller for avoiding an interference with an external signal on a frequency of the second communication protocol; the method comprising the steps of detecting an enabled communication involving the first wireless transceiver module; and providing the controller with a blocking signal in response to the enabled communication.

The control of communications within a communication system typically comprises communications between an electronic device and another electronic device, wherein the electronic device may be a mobile phone, a node of a wireless or wired network and so on. By providing the controller of the second wireless transceiver module with a blocking signal when the first wireless transceiver module is involved in an enabled communication like a transmission wherein the first wireless transceiver module operates as a transmitter or a receiver, an improved communication system is obtained with a reduced risk of interference between transmission involving the first and the second wireless transceiver module.

Yet a further object of the invention is realized by a communication system, comprising a wired network; a first wireless transceiver module coupled to the wired network using a first communication protocol for communicating with a first external device; a second wireless transceiver module coupled to the wired network using a second communication protocol for communicating with a second external device, the second wireless transceiver module comprising a controller for avoiding an interference with an external signal on a frequency of the second communication protocol; and a mediator coupled to the first wireless transceiver module and the second wireless transceiver module for providing the controller with a blocking signal in response to an enabled communication involving the first wireless transceiver module.

A communication system may comprise a wired network. Prime examples are a wireless local area network (WLAN), where the wired network is used to interconnect the nodes or hubs that communicate with external devices via wireless communication protocols like the IEEE 802.11 protocol. However, more than one protocol may be used at the same time, in which case the nodes may comprise a first wireless transceiver module using a first communication protocol and a second wireless transceiver module using a second communication protocol, with the second wireless transceiver module having a controller like CSMA-CA. By coupling a mediator between the first and the second wireless transceiver module, interference at the nodes can be reduced by preventing the collision of signals due to the transmission of a signal like a packet by the second wireless transceiver module when the first wireless transceiver module is involved in an enabled communication like the reception or transmission of another signal.

In an embodiment of communication system according to the present invention, the mediator is coupled to the controller via the wired network.

This has the advantage that the second wireless transceiver module may be located in another part of the wired network, like another node or hub. This way, in principle all wireless transceiver modules that are connected to the wired network and that implement the second communication protocol may be blocked by a blocking signal from the mediator to protect an enabled communication involving at least one wireless transceiver module using the first communication protocol. This not only reduces the chance of interference between communications from the first and second wireless transceiver module in a node or hub, but also in the wireless part of the network that is being covered by the various nodes or hubs.

In a further embodiment of the communication system according to the present invention, the first wireless transceiver module comprises a further controller for avoiding an interference with a further external signal on a frequency of the second communication protocol; and the mediator is arranged to provide the further controller with a further blocking signal responsive to a further enabled communication involving the second wireless transceiver module.

This has the advantage that not only the communications involving the first wireless transceiver module can be protected, but that the communications involving the second wireless transceiver module can be protected as well.

The invention is described in more detail and by way of non-limiting examples with reference to the accompanying drawings, wherein.

The embodiments of the present invention will be described with the aid of the open systems interconnection reference model (OSI-RM).

Figure 1:
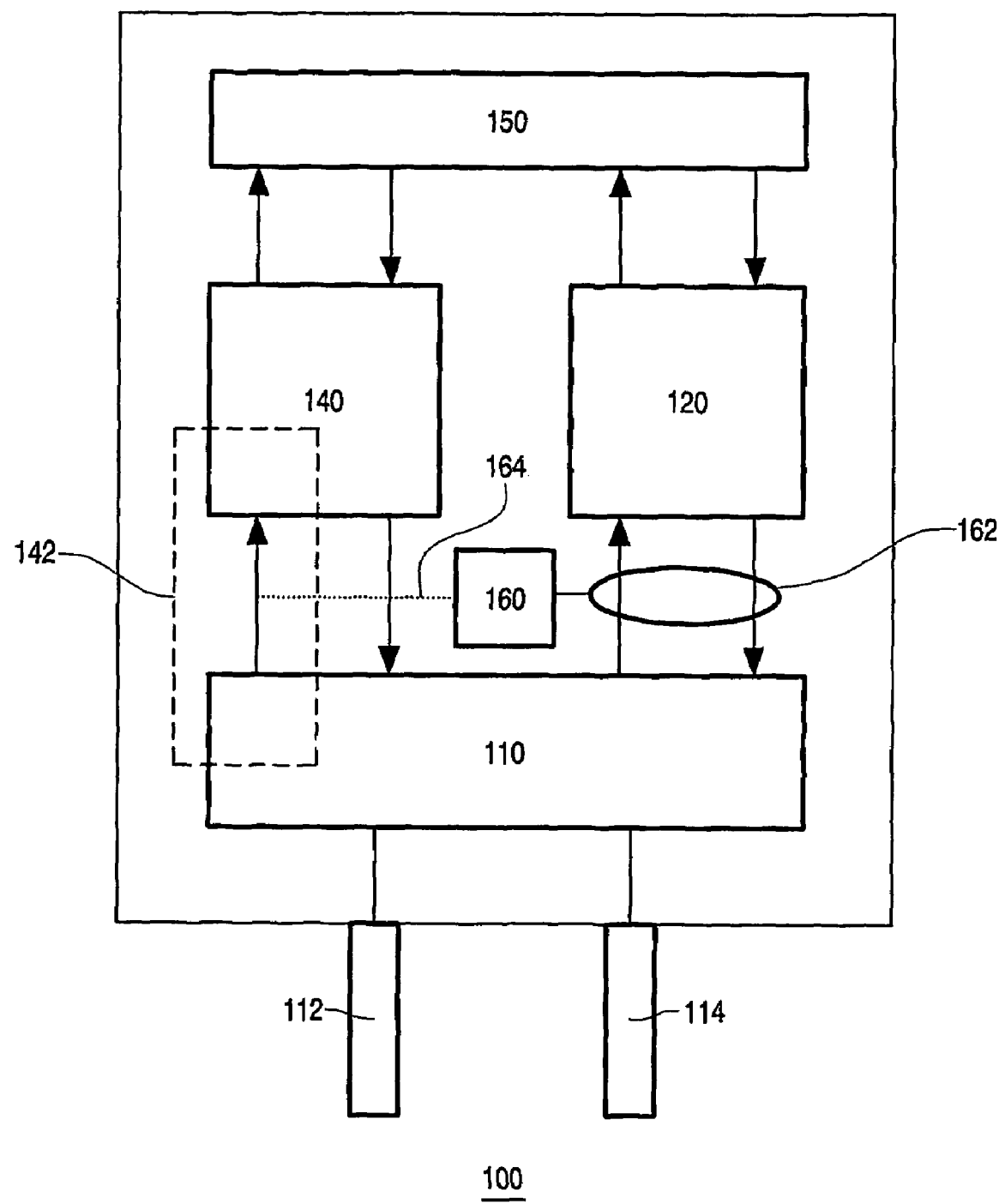
FIG. 1 depicts an exemplary embodiment of an electronic device according to the present invention.

In FIG. 1, the electronic device 100 includes a first wireless transceiver module 120 and a second wireless transceiver module 140, which are arranged to communicate with a physical layer 110 and an application layer 150, as indicated by the arrows between the first wireless transceiver module 120 and the second wireless transceiver module 140 on the one hand, and the physical layer 110 and the application layer 150 on the other hand. Such an electronic device 100 may for instance be a portable computer, which uses the first wireless transceiver module 120 for implementing the wireless LAN protocol, and uses the second communication module for communicating with an in-home network, for which the portable computer may be used as a remote control. However, many other examples can be thought of without departing from the scope of the invention.

In FIG. 1, the first wireless transceiver module 120 and the second wireless transceiver module 140 share the physical layer 110 of electronic device 100. The physical layer 110 may comprise a connection to the receiver (Rx) antenna 112 for feeding a received signal to a radio frequency (RF) to internal frequency (IF) downconverter, which is coupled to an analog to digital (AD) converter, the digital signal being further processed by at least one of the first wireless transceiver module 120 and second wireless transceiver module 140. The physical layer 110 may further comprise a digital to analog converter for converting a digital signal from one of the first wireless transceiver module 120 and second wireless transceiver module 140 into an analog signal, and an upconverter to transform the analog signal into a radio signal for the transmission (Tx) antenna 114. Rx antenna 112 and Tx antenna 114 may be combined into a single Rx/Tx antenna. It this point, it is emphasized that it is not necessary that the physical layer 110 is shared by the first wireless transceiver module 120 and the second wireless transceiver module 140 by the extent as described, the present invention also offers advantages for arrangements where the first wireless transceiver module 120 and the second wireless transceiver module 140 share only a few elements of the physical layer, or just share a transceiver (Rx/Tx) antenna.

The first wireless transceiver module 120 and the second wireless transceiver module 140 may be dedicated baseband hardware chips, combinations of chips, or combinations of software and hardware implementations of baseband protocols like Zigbee, Bluetooth, IEEE 802.11 or other protocols, and may include at least parts of the functionality of the physical layer 110 and the application layer 150; this is of no particular relevance to the present invention, as long as at least one of the wireless transceiver modules implements a controller 142 for avoiding an interference with an external signal on a frequency of the communication protocol of the wireless transceiver module, here the second wireless transceiver module 140. Such a controller 142 may be a known implementation of the CSMA-CA principle, although other collision avoidance methods may be implemented as well, since the general principles of these methods are comparable.

Methods like the CSMA-CA method measure the signal strength or power in the channel selected for the transmission of a data packet by the wireless transceiver module, which is the second wireless transceiver module 140 in FIG. 1. When the power in the channel exceeds a predefined threshold, the transmission of the data is postponed. This is done to avoid an interference with an external signal present in the channel, that is, on a frequency or in a frequency range, of the communication protocol of the wireless transceiver module involved, in order to prevent the loss of the packet. It is important to realize that this external signal may be another transmission using the same communication protocol, but that this not necessarily has to be the case; the presence of other external signals, like a transmission using another protocol but in the same frequency range as well as noise may lead the controller to postpone the transmission of the packet.

However, external signals are not the only source of interference for the transmissions of such packets in electronic device 100, especially if the communication protocols of the first wireless transceiver module 120 and the second wireless transceiver module 140 share at least a part of a frequency range, or if the first wireless transceiver module 120 and the second wireless transceiver module 140 share at least a part of the physical layer 110. In this scenario, the simultaneous transmission of a packet by one of the wireless transceiver modules and the reception or transmission by another packet by the other wireless transceiver module is likely to lead to the loss of the two packets. In other words, the presence of two wireless transceiver modules in one device introduces the risk of interference at the device level.

The present invention is based on the realization that interference (or collision) avoidance methods, which are being implemented to avoid interference in the wireless channel, can also be used to avoid a number of collision scenarios at the device level. To this end, the electronic device 100 includes a mediator 160, which is responsive to the enabled communications involving the first wireless transceiver module 120. In this context, an enabled communication includes the transmission or the reception of a packet by the first wireless transceiver module 120. The mediator 160 can be made responsive to the enabled communications in several ways. In FIG. 1, the mediator 160 is coupled to the communication channels 162 between the first wireless transceiver module 120 and the physical layer 110. It is in fact preferable, although not strictly necessary, that the mediator 160 is located nearby, or forms a part of, the physical layer, because at this level of the electronic device 100, there is a direct relationship between the signal detected by the mediator 160 and the reception or transmission of the enabled communication involving the first wireless transceiver module 120. In other words, at this level, there is a direct relation between the detected signal and the temporal shape of the enabled communication. In contrast, in the higher layers of the electronic device 100, like for instance the application layer 150, this relation is much less pronounced, for instance because the delay between a transmission request from the application layer and the actual transmission is not constant, but a function of the signal processing to be done by the first wireless transceiver module 120. This makes it more difficult to prevent the collision of a packet transmitted by the second wireless transceiver module 140 with the enabled communication involving the first wireless transceiver module 120.

At this point, it is stipulated that the mediator 160 may be observing control commands from the first wireless transceiver module 120 to the physical layer 110 rather than actual packet transmissions or receptions, because these control signals are a clear indication of the expected arrival of the packet in the physical layer 110. This way, the mediator 160 can provide an early warning system that is capable of signalling the controller 142 of the second wireless transceiver module 140 that an interference is likely to occur well before the controller 142 itself is capable of detecting the possible interference.

Upon detection of a control signal indicating the enabled communication, or upon detecting the enabled communication itself, the mediator 160 generates a blocking signal, which it feeds into the controller 142 of the second wireless transceiver module 140. This blocking signal may be as simple as an unmodulated signal being fed into the received signal strength indication (RSSI) channel of the controller 142 via conductor 164, which will suggest the presence of an external signal in the channel, or frequency range, used by the second communications protocol of the second wireless transceiver module 140. Consequently, the controller 142 will block any transmissions by the second wireless transceiver module 140 according to its collision avoidance mechanism, and will thus prevent the interference between the enabled communication involving the first wireless transceiver module 120 and the transmission of a packet by the second wireless transceiver module 140. It will be obvious by those skilled in the art that the blocking signal may have different shapes depending on where the signal is being fed into the controller 142. However, by feeding a blocking signal into the RSSI channel, the mediator 160 can be kept very simple. In principle, a simple digital signal generator can be used to feed a digital value into the RSSI channel indicating a signal strength exceeding the threshold of the collision avoidance protocol.

Alternatively, when the blocking pulse is fed into the hardware assessing the external analog signal to determine the external signal strength, the mediator may be formed by a single transistor with a source coupled to a power line and a drain coupled to the conductor 164, with its gate being coupled to the communication channels 162.

The mediator 160 may provide the blocking signal during a time interval matching the duration of the enabled communication. This can be useful in situations where the first wireless transceiver module 120 is enabled to transmit or receive packets during well-defined time intervals. The detection of a signal in the communication channels 162 signals the mediator 160 that such a time interval has started, and the mediator 160 may be arranged to generate the blocking signal for the duration of the time interval by including a clock signal and a counter in the mediator 160. Alternatively, the mediator is not arranged to observe the communication channels 162, but is made responsive to the same clock signal that controls the first wireless transceiver module 120 in order to optimize the synchronization between the time interval of the enabled communication and the generation of the blocking signal by the mediator 160.

Furthermore, if the first wireless transceiver module 120 includes a further controller not shown for avoiding an interference with a further external signal on a frequency of the first communication protocol, the mediator 160 can be arranged to provide the further controller with a further blocking signal suggesting the presence of the further external signal in response to a further enabled communication involving the second wireless transceiver module 140. In other words, the controller is led to believe that an external signal is already present in the wireless channel to be used by the transmission of the second wireless transceiver module. This way, the transmissions of both wireless transceiver modules can be protected against interference with enabled communications involving the other wireless transceiver module, thus reducing the occurrence of interference within the electronic device 100 even further.

An important advantage of the aforementioned embodiments of the electronic device 100 according to the present invention is that the first wireless transceiver module 120 and the second wireless transceiver module 140 do not have to be significantly modified to implement the present invention, which makes the present invention relatively cheap to implement.

Figure 2:
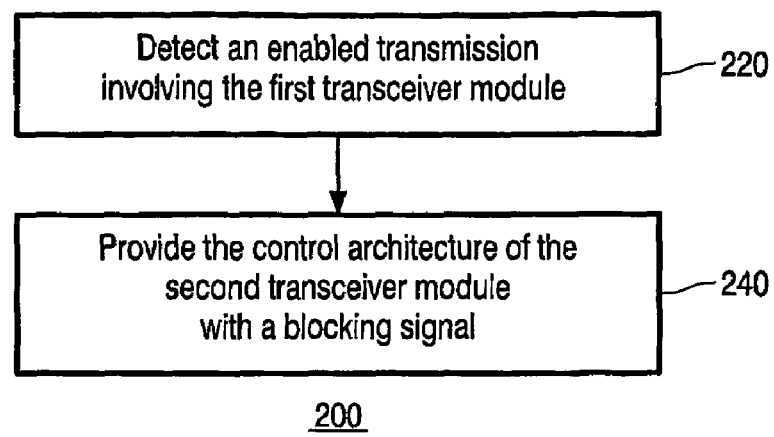
FIG. 2 depicts a flowchart of the method according to the present invention.

Thus, the present invention provides a method for avoiding, or at least reducing the risk of interference between the first wireless transceiver module 120 and the second wireless transceiver module 140 inside the electronic device 100, or another communication system for that matter. This is shown in FIG. 2; in a first step 220 an enabled communication involving the first wireless transceiver module 120 is detected, and in a second step 240, the controller 142 is provided with a blocking signal in response to the enabled communication. Obviously, the method also helps to reduce interference in the frequency bands shared by the first wireless transceiver module and the second wireless transceiver module.

Figure 3:
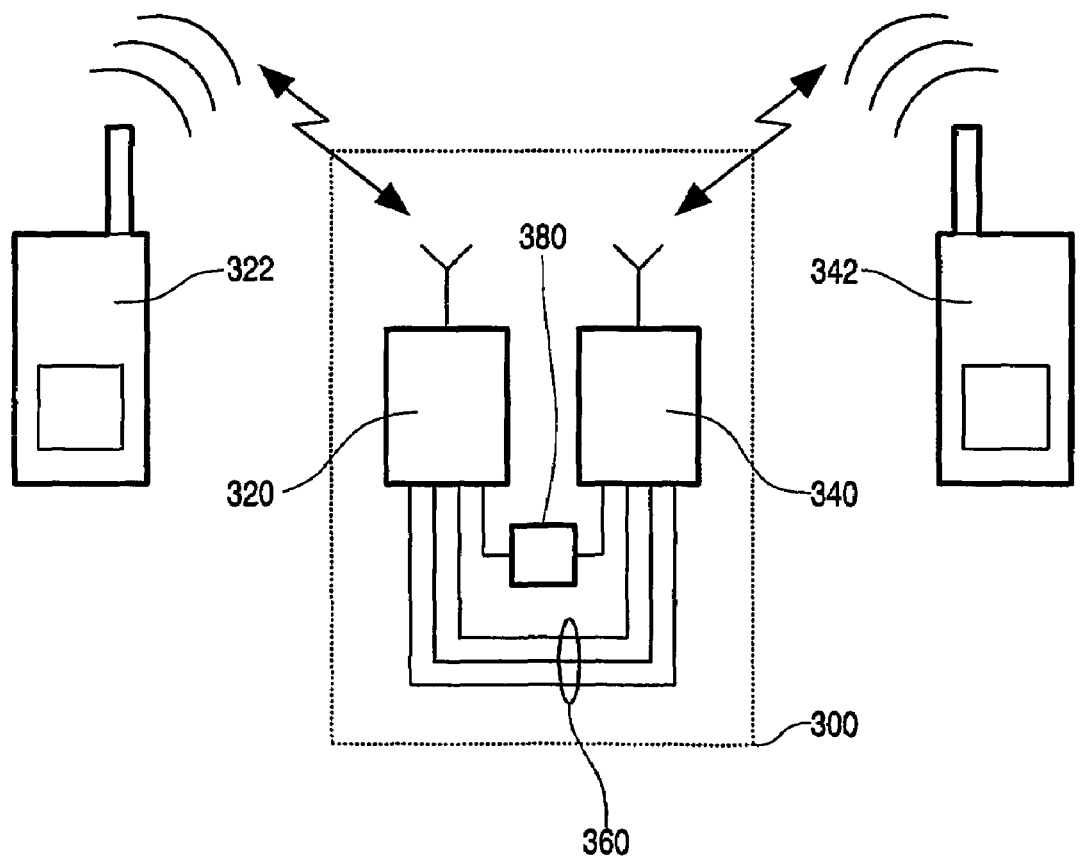
FIG. 3 depicts a communication system according to the present invention.

The present invention may also be used to prevent, or at least reduce, interference in communication systems like wireless networks, for instance a wireless LAN. An embodiment of such a communication system is shown in FIG. 3, which is similar to the device described in connection with FIG. 1. Communication system 300 has a first wireless transceiver module 320 for communicating with a first external device 322 using a first communication protocol, and a second wireless transceiver module 340 for communicating with a second external device 342 using a second communication protocol. Both the first wireless transceiver module 320 as well as the second wireless transceiver module 340 are coupled to a wired network 360, with the second wireless transceiver module 340 also having a controller for avoiding an interference with an external signal on a frequency of the second communication protocol. The controller, which may be an implementation of the CSMA-CA method, is not shown in FIG. 3 for reasons of clarity only.

The present invention can be used to tackle two main causes of interference in communication system 300. First of all, the first wireless transceiver module 320 and the second wireless transceiver module 340 may be located in one and the same hub of the communication system 300, where they share at least a part of the physical layer of the hub. In this particular arrangement, internal interference, like interference in a shared physical layer, as described in FIG. 1 and its detailed description may occur, with the hub being the electronic device in this case. Consequently, an implementation of a mediator 380 may be chosen in accordance with the teachings of FIG. 1 and its detailed description.

Alternatively, the first wireless transceiver module 320 and the second wireless transceiver module 340 may be located in separate hubs that both are connected to the wired network 360 to transport the wireless communications with for instance electronic devices 322 and 342 to signal processing devices not shown that are coupled to the wired network. First wireless transceiver module 320 may be arranged to communicate with the first electronic device 322 using a first communication protocol, and second wireless transceiver module 340 may be arranged to communicate with the second electronic device 342 using a second communication protocol. Now, if the first wireless transceiver module 320 and the second wireless transceiver module 340 have overlapping service areas, interference can occur in the overlap area if a communication between the first wireless transceiver module 320 and the first electronic device 322 on the one hand, and a communication between the second wireless transceiver module 340 and the second electronic device 342 on the other hand appear at least partially simultaneously. It is emphasized that this is an interference, or collision, between two packets in the wireless domain of the communication system 300, for which the present invention can also provide a solution.

To this end, the mediator 380 is coupled between the first wireless transceiver module 320 and the second wireless transceiver module 340 via the wired network 360, for providing the controller of the second wireless transceiver module 340 with a blocking signal indicating the presence of the external signal in response to an enabled communication involving the first wireless transceiver module 320. This way, when the first wireless transceiver module 320 is involved in an enabled communication including a transmission or reception of a packet, the second wireless transceiver module 340 can be blocked by the mediator 380 by reusing the controller of the second wireless transceiver module 340 that implements a collision avoidance method for the prevention of interference with the communications involving the first wireless transceiver module 320.

In addition, if the first wireless transceiver module 320 has a further controller for avoiding an interference with a further external signal on a frequency of the first communication protocol, enabled communications involving the second wireless transceiver module 340 can be protected by modifying the mediator 380 to provide the further controller with a further blocking signal suggesting the presence of the further external signal responsive to a further enabled communication involving the second wireless transceiver module.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to an advantage.

The invention claimed is:

1. An electronic device, comprising:
    a first wireless transceiver module using a first communication protocol;
    a second wireless transceiver module using a second communication protocol, the second wireless transceiver module comprising a controller for avoiding an interference with an external signal on a frequency of the second communication protocol; and
    a mediator coupled between the first wireless transceiver module and the second wireless transceiver module, the mediator being arranged to provide the controller with a blocking signal to block the second wireless transceiver module in response to an enabled communication involving the first wireless transceiver module.

2. The electronic device as claimed in claim 1, wherein the controller implements at least a part of a carrier sense multiple access-collision avoidance principle.

3. The electronic device as claimed in claim 1, wherein the first wireless transceiver module and the second wireless transceiver module share at least a part of a physical layer.

4. The electronic device as claimed in claim 1, wherein the mediator is arranged to provide the blocking signal during a time interval matching the duration of the enabled communication.

5. The electronic device, as claimed in claim 1, wherein the first wireless transceiver module comprises a further controller for avoiding an interference with a further external signal on a frequency of the first communication protocol;
    the mediator being further arranged to provide the further controller with a further blocking signal in response to a further enabled communication involving the second wireless transceiver module.

6. The electronic device of claim 1, wherein the mediator is coupled to a communication channel between the first wireless transceiver module and a physical layer.

7. The electronic device of claim 6, wherein the physical layer is shared between the first wireless transceiver module and the second wireless transceiver module.

8. A method for controlling communications involving a communication system, the communication system comprising:
    a first wireless transceiver module using a first communication protocol;
    a second wireless transceiver module using a second communication protocol, the second wireless transceiver module comprising a controller for avoiding an interference with an external signal on a frequency of the second communication protocol;
    the method comprising the acts of:
    detecting an enabled communication involving the first wireless transceiver module; and
    providing the controller with a blocking signal to block the second wireless transceiver module in response to the enabled communication.

9. A communication system, comprising:
    a wired network;
    a first wireless transceiver module coupled to the wired network using a first communication protocol for communicating with a first external device;
    a second wireless transceiver module coupled to the wired network using a second communication protocol for communicating with a second external device, the second wireless transceiver module comprising a controller for avoiding an interference with an external signal on a frequency of the second communication protocol; and a mediator coupled to the first wireless transceiver module and the second wireless transceiver module for providing the controller with a blocking signal to block the second wireless transceiver module in response to an enabled communication involving the first wireless transceiver module.

10. The communication system as claimed in claim 9, wherein the mediator is coupled to the controller via the wired network.

11. The communication system as claimed in claim 9, wherein the first wireless transceiver module comprises a further controller for avoiding an interference with a further external signal on a frequency of the first communication protocol; and
the mediator is arranged to provide the further controller with a further blocking signal responsive to a further enabled communication involving the second wireless transceiver module.

12. The communication system as claimed in claim 9, wherein the first transceiver module and the second transceiver module share at least a part of a physical layer.

13. The communication system of claim 9, wherein the mediator is coupled to a communication channel between the first wireless transceiver module and a physical layer.

14. The communication system of claim claim 13, wherein the physical layer is shared between the first wireless transceiver module and the second wireless transceiver module.

15. An electronic device, comprising:
a first wireless transceiver module using a first communication protocol;
a second wireless transceiver module using a second communication protocol, the second wireless transceiver module comprising a controller for avoiding an interference with an external signal on a frequency of the second communication protocol; and
a mediator coupled between the first wireless transceiver module and the second wireless transceiver module, the mediator being arranged to provide the controller with a blocking signal to block the second wireless transceiver module in response to an enabled communication involving the first wireless transceiver module;
wherein the mediator is configured to observe commands from the first wireless transceiver module to a physical layer.

16. An electronic device, comprising:
a first wireless transceiver module using a first communication protocol;
a second wireless transceiver module using a second communication protocol, the second wireless transceiver module comprising a controller for avoiding an interference with an external signal on a frequency of the second communication protocol; and
a mediator coupled between the first wireless transceiver module and the second wireless transceiver module, the mediator being arranged to provide the controller with a blocking signal to block the second wireless transceiver module in response to an enabled communication involving the first wireless transceiver module;
wherein the blocking signal is fed into a received signal strength indication channel of the controller.

17. The electronic device of claim 16, wherein the blocking signal has a signal strength exceeding a threshold of a collision avoidance protocol of the second wireless transceiver module.

18. A method for controlling communications involving a communication system, the communication system comprising:
a first wireless transceiver module using a first communication protocol;
a second wireless transceiver module using a second communication protocol, the second wireless transceiver module comprising a controller for avoiding an interference with an external signal on a frequency of the second communication protocol;
the method comprising the acts of:
detecting an enabled communication involving the first wireless transceiver module; and
providing the controller with a blocking signal to block the second wireless transceiver module in response to the enabled communication;
wherein the detecting act includes observing commands from the first wireless transceiver module to a physical layer.

19. The method of claim 18, wherein the physical layer is shared between the first wireless transceiver module and the second wireless transceiver module.

20. A method for controlling communications involving a communication system, the communication system comprising:
a first wireless transceiver module using a first communication protocol;
a second wireless transceiver module using a second communication protocol, the second wireless transceiver module comprising a controller for avoiding an interference with an external signal on a frequency of the second communication protocol;
the method comprising the acts of:
detecting an enabled communication involving the first wireless transceiver module; and
providing the controller with a blocking signal to block the second wireless transceiver module in response to the enabled communication;
wherein the providing act includes feeding the blocking signal into a received signal strength indication channel of the controller.

21. The method of claim 20, wherein the blocking signal has a signal strength exceeding a threshold of a collision avoidance protocol of the second wireless transceiver module.

22. A communication system, comprising:
a wired network;
a first wireless transceiver module coupled to the wired network using a first communication protocol for communicating with a first external device;
a second wireless transceiver module coupled to the wired network using a second communication protocol for communicating with a second external device, the second wireless transceiver module comprising a controller for avoiding an interference with an external signal on a frequency of the second communication protocol; and
a mediator coupled to the first wireless transceiver module and the second wireless transceiver module for providing the controller with a blocking signal to block the second wireless transceiver module in response to an enabled communication involving the first wireless transceiver module;
wherein the mediator is configured to observe commands from the first wireless transceiver module to a physical layer.

23. A communication system, comprising:
a wired network;
a first wireless transceiver module coupled to the wired network using a first communication protocol for communicating with a first external device;
a second wireless transceiver module coupled to the wired network using a second communication protocol for communicating with a second external device, the second wireless transceiver module comprising a controller for avoiding an interference with an external signal on a frequency of the second communication protocol; and
a mediator coupled to the first wireless transceiver module and the second wireless transceiver module for providing the controller with a blocking signal to block the second wireless transceiver module in response to an enabled communication involving the first wireless transceiver module;
wherein the blocking signal is fed into a received signal strength indication channel of the controller.

24. The communication system of claim 23, wherein the blocking signal has a signal strength exceeding a threshold of a collision avoidance protocol of the second wireless transceiver module.

* * * * *